US010303593B2

(12) United States Patent
Katagiri et al.

(10) Patent No.: US 10,303,593 B2
(45) Date of Patent: May 28, 2019

(54) DETECTING TAMPERING OF DATA DURING MEDIA MIGRATION, AND STORAGE DEVICE

(71) Applicant: International Business Machines Corporation, Armonk, NY (US)

(72) Inventors: Takashi Katagiri, Tokyo (JP); Yuhko Mori, Tokyo (JP); Hirokazu Nakayama, Tokyo (JP); Yutaka Oishi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 13/692,830

(22) Filed: Dec. 3, 2012

(65) Prior Publication Data

US 2013/0159643 A1    Jun. 20, 2013

(30) Foreign Application Priority Data

Dec. 19, 2011   (JP) .................................. 2011-277008

(51) Int. Cl.
*G06F 12/00*      (2006.01)
*G06F 21/64*      (2013.01)

(52) U.S. Cl.
CPC .............. *G06F 12/00* (2013.01); *G06F 21/64* (2013.01)

(58) Field of Classification Search
CPC .................................. G06F 12/00; G06F 21/64
USPC ......................................... 711/156, 161–162
See application file for complete search history.

(56) References Cited

U.S. PATENT DOCUMENTS

| | | | |
|---|---|---|---|
| 5,809,511 A * | 9/1998 | Peake | |
| 2002/0002561 A1* | 1/2002 | Higashiura et al. | 707/204 |
| 2003/0182313 A1* | 9/2003 | Federwisch et al. | 707/200 |
| 2006/0010490 A1* | 1/2006 | Makita | 726/9 |
| 2006/0031651 A1* | 2/2006 | Nonaka et al. | 711/163 |
| 2006/0047923 A1* | 3/2006 | Kodama | 711/161 |
| 2006/0126468 A1* | 6/2006 | McGovern et al. | 369/53.1 |
| 2006/0143418 A1* | 6/2006 | Takahashi et al. | 711/165 |
| 2007/0043773 A1* | 2/2007 | Tsuji | 707/200 |
| 2007/0079126 A1* | 4/2007 | Hsu et al. | 713/176 |
| 2007/0233828 A1* | 10/2007 | Gilbert | 709/223 |
| 2008/0063198 A1* | 3/2008 | Jaquette et al. | 380/201 |
| 2008/0091898 A1* | 4/2008 | Takahashi et al. | 711/162 |
| 2008/0133854 A1* | 6/2008 | Fukuguchi | 711/161 |

FOREIGN PATENT DOCUMENTS

| | | |
|---|---|---|
| JP | 2005033191 A | 2/2005 |
| JP | 2006293864 A | 10/2006 |
| JP | 2007072957 A | 3/2007 |

* cited by examiner

*Primary Examiner* — Tuan V Thai
*Assistant Examiner* — Tasnima Matin
(74) *Attorney, Agent, or Firm* — Zilka-Kotab, P.C.

(57) ABSTRACT

A method for detecting at a migration destination medium a change in data during media migration between write once read many (WORM) media according to one embodiment includes writing data for WORM from a migration source medium to the migration destination medium; holding an identifier (ID) of the source medium in a non-user storage area in the destination medium; and holding information indicating a feature of the data in the non-user storage area.

20 Claims, 5 Drawing Sheets

\*MIGRATION INFORMATION DURING MEDIA MIGRATION

MIGRATION INFORMATION HELD IN CARTRIDGE c
DURING MIGRATION FROM TAPE CARTRIDGE a TO
TAPE CARTRIDGE b AND FROM TAPE CARTRIDGE b
TO TAPE CARTRIDGE c

300

- ID OF TAPE CARTRIDGE = a
  - TOTAL AMOUNT OF DATA a
  - HASH VALUE OF DATA a
- ID OF TAPE CARTRIDGE = b
  - TOTAL AMOUNT OF DATA b
  - HASH VALUE OF DATA b

FIG. 3

DETECTING TAMPERING OF DATA DURING MEDIA MIGRATION, AND STORAGE DEVICE

RELATED APPLICATION

This application claims priority to Japanese Patent Application Serial Number 2011-277008, filed Dec. 19, 2011, which is herein incorporated by reference.

BACKGROUND

The present invention relates to a method for detecting tampering during media migration from one WORM medium to another, and more specifically, this invention relates to a method for detecting a change in data when the data is migrated through tape cartridges over generations.

Migration of data between recording media is essential for long-term storage (archiving) over a long period of time, for example, 100 years. Because of technical innovations in hardware and software, data migration every three to five years is recommended. Typical recording media for archiving are tape cartridges. Examples of tape drives for tape cartridges include Linear Tape Open (LTO) tape drives and the IBM® Enterprise tape drive model TS1130. Even though such tape drives, recording media, and the like change over generations, data recorded thereon should maintain an ability to be migrated to a current medium and still be readable.

It is also a goal of data storage to prevent crimes in which persons having access rights to data illegally rewrite the data, such as tampering of research data and rewriting of books containing financial information. Such anti-data tampering is currently a big issue with data storage.

In tape drives, Write Once Read Many (WORM) media are used as tools for preventing tampering of data. WORM media are tape cartridges where data, once written, cannot be updated or erased. Similar to normally updatable and erasable media, WORM media are physically rewritable because data is magnetically recorded thereon. Persons who are familiar with the WORM format are able to rewrite data in an undetectable manner at the time of reading. Therefore, tape drives have a mechanism for detecting if persons have maliciously tampered with the firmware of the tape drives and updated or erased data in WORM media.

Some conventional attempts at protecting data from tampering include presetting WORM attributes in media to prevent data written to a migration destination from being updated during migration, and, if a migration source medium is a WORM medium, a WORM medium is also selected as a migration destination medium.

Accordingly, a conventional tape drive is not sufficient to prevent data from being tampered with or deleted during migration. For example, conventional techniques do not guarantee that data that is initially written in a migration destination medium during migration from one WORM medium to another is the same as the data in the source medium.

Therefore, it would be beneficial to provide a method for detecting tampering during media migration from one WORM medium to another, and a storage device capable of such detection.

BRIEF SUMMARY

A storage device for generating and recording metadata in a migration destination medium is provided in one embodiment. The metadata is for enabling detection of a change in data during media migration between write once read many (WORM) media. The device includes a controller having logic adapted to write data for WORM from a migration source medium to a migration destination medium; logic adapted to hold an identifier (ID) of the source medium in a non-user storage area in the destination medium; and logic adapted to hold feature information in the non-user storage area, wherein the feature information indicates one or more features of the data.

A method for detecting at a migration destination medium a change in data during media migration between WORM media according to one embodiment includes writing data for WORM from a migration source medium to the migration destination medium; holding an ID of the source medium in a non-user storage area in the destination medium; and holding information indicating a feature of the data in the non-user storage area.

A computer program product according to one embodiment for detecting at a migration destination medium a change in data during media migration between WORM media includes a computer readable storage medium having program code embodied therewith. The program code is readable/executable by a device to write, by the device, data for WORM from a migration source medium to the migration destination medium; hold, by the device, an ID of the source medium in a non-user storage area in the destination medium; and hold, by the device, feature information in the non-user storage area, wherein the feature information indicates one or more features of the data.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 illustrates a table including migration information held in cartridges, according to one embodiment.

DETAILED DESCRIPTION

Figure 1:
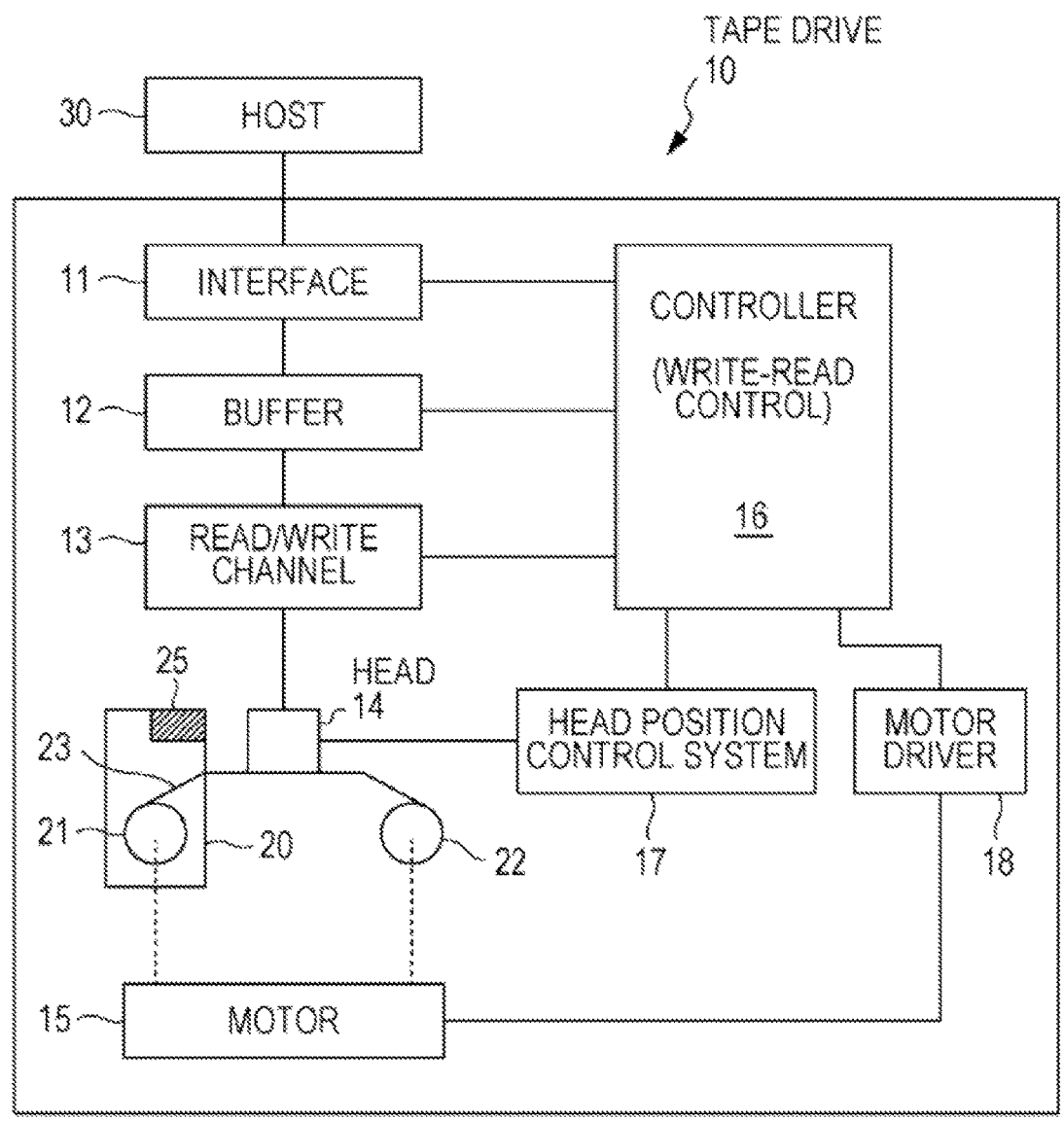
FIG. 1 illustrates an example configuration of a tape drive according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied, from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for detecting change or tampering of data during media migration.

A storage device for generating and recording metadata in a migration destination medium is provided in one general embodiment. The metadata is for enabling detection of a change in data during media migration between write once read many (WORM) media. The device includes a controller having logic adapted to write data for WORM from a migration source medium to a migration destination medium; logic adapted to hold an identifier (ID) of the source medium in a non-user storage area in the destination medium; and logic adapted to hold feature information in the non-user storage area, wherein the feature information indicates one or more features of the data.

In another general embodiment, a method for detecting at a migration destination medium a change in data during media migration between WORM media includes writing data for WORM from a migration source medium to the migration destination medium; holding an ID of the source medium in a non-user storage area in the destination medium; and holding information indicating a feature of the data in the non-user storage area.

According to another general embodiment, a computer program product for detecting at a migration destination medium a change in data during media migration between WORM media includes a computer readable storage medium having program code embodied therewith. The program code is readable/executable by a device to write, by the device, data for WORM from a migration source medium to the migration destination medium; hold, by the device, an ID of the source medium in a non-user storage area in the destination medium; and hold, by the device, feature information in the non-user storage area, wherein the feature information indicates one or more features of the data.

According to one embodiment, a storage device is adapted for generating and recording metadata in a migration destination medium for enabling detection of a change in data during media migration between Write Once Read Many (WORM) media. The change may be due to tampering or some other form of change. The device includes a read-write controller that executes the steps of: (a) writing data for WORM from a migration source medium to a migration destination medium; (b) holding an identifier (ID) of the source medium in a non-user storage area in the destination medium; and (c) holding information indicating one or more features of the data in the non-user storage area.

Furthermore, in order to detect a change in the data during media migration, the controller executes the steps of: (d) checking whether a recorded and managed ID of the source medium has been held in the non-user storage area in the destination medium; (e) checking whether the feature information on the data has been held in the non-user storage area; (f) checking whether the feature information on the data and the ID match the information and ID held in the non-user storage area; and (g) determining that tampering has occurred during migration when a negative determination is obtained in at least one of the checking steps. A negative determination includes not being able to find data that is supposed to be held in the on-user storage area or a non-matching comparison of information.

In this device, the data's feature information includes a total amount of the data or a hash value of the data, and the (f) step of checking whether the feature information on the data matches the held information includes comparing the feature information checked in the (e) step of checking with feature information generated from data written to the destination medium. Furthermore, the feature information may be held in a housekeeping data set (HKDS), a data set (DS) in a tape, or a cartridge memory (CM), in various approaches.

Furthermore, the source medium may serve as a migration destination medium of a previous-generation medium, and may hold an ID of the previous-generation medium and feature information of the data, in various approaches.

Also, the source medium may hold, in addition to the data of the previous-generation, data additionally recorded when the source medium is used, the ID of the source medium is assigned to the additionally recorded data, and the feature information includes feature information on the additionally recorded data, in various approaches.

Additionally, the source medium does not hold a media ID or feature information, in one embodiment, when the source medium is an original medium, and the destination medium assigns feature information to the ID of the source medium and data therein in this embodiment.

In order to achieve these advancements, in one embodiment, a method for detecting a change in data during media migration between WORM media is provided. In order to generate and record metadata in the migration destination medium so that a change in the data may be detected during media migration, (a) data for WORM in a migration source medium is written in the migration destination medium, (b) an ID of the source medium is held in a on-user storage area in the destination medium, and (c) information indicating a feature of the data is held in the non-user storage area. The method comprises the steps of: (d) checking whether a recorded and managed ID of the source medium has been held in the non-user storage area in the destination medium; (e) checking whether the feature information of the data has been held in the non-user storage area; (f) checking whether the feature information of the data and the ID match the information and ID held in the non-user storage area; and (g) determining that tampering has occurred during migration when a negative determination is obtained in at least one of the checking steps.

In addition, a computer program product for detecting at a migration destination medium a change in data during media migration between WORM media is provided. In order for a storage device to generate and record metadata in the migration destination medium so that a change in data may be detected during media migration, (a) data for WORM in a migration source medium is written in the migration destination medium, (b) an ID of the source medium is held in a non-user storage area in the destination medium, and (c) information indicating a feature of the data is held in the non-user storage area. The computer program product is stored to a computer readable storage medium, and comprises computer readable program code configured to cause the storage device to execute the steps of: (d) checking whether a recorded and managed ID of the source medium has been held in the non-user storage area in the destination medium; (e) checking whether the feature information of the data has been held in the non-user storage area; (f) checking whether the feature information of the data and the ID match the information and ID held in the non-user storage area; and (g) determining that tampering has occurred during migration if a negative determination is obtained in at least one of the checking steps.

The use of any of the embodiments described herein makes it possible to detect that data has been tampered with/deleted during migration.

In one embodiment (hereinafter referred to as an "exemplary embodiment"), a change in data may be detected when the content of the data is migrated through tape cartridges over generations.

This embodiment enables detection of whether data, once recorded on a WORM medium, has been updated/erased even through migration. When data is migrated, feature information (also called "migration information") concerning the data is added to the data, such as the ID of a WORM medium on which the data was first recorded, the total amount of written data, a hash of the data written on the medium, etc. When migration to a WORM medium is performed, the feature information, as well as existing written data, is added to the migration destination medium. The feature information is stored in a non-user storage area so that the feature information may not be easily rewritten using an application capable of such rewriting. In this specification, a first-generation (original) medium and subsequent media over other generations may be set as migration source media.

Conventionally, in order to migrate data, two tape drives and two WORM media (migration source and migration destination) are used. The two tape drives may transfer data written in a tape medium via a fiber channel. An environment where various kinds of information are exchangeable via Ethernet is also assumed. The embodiments described herein may not necessarily use two tape drives, and may use a single tape drive or more tape drives. The tape drives may be stored in a tape library.

The implementation of the embodiments described herein utilizes a migration controller that transmits a media ID, or the like, to a migration destination WORM medium. The migration controller may be incorporated in firmware of each of the tape drives, may be incorporated in the tape library, or may be present in any other or device in a system.

The feature information is added using a writing technique which only the migration controller is allowed to use, in one approach. The information to be added may be a hash of the recorded data in place of the total amount of data, or a combination of both pieces of information. After all the pieces of data have been written, feature information, such as the total amount of data, is used as a flag to indicate the completion of writing. The feature information is written to and held in the migration destination WORM medium using a writing technique which only the migration controller is allowed to use, in one approach. The destination medium holds the feature information concerning the source medium, thus guaranteeing that the content of all the pieces of data written in the migration source WORM medium has been held without being tampered with.

FIG. 1 illustrates an example configuration of a tape drive 10 according to one embodiment. The tape drive 10 writes a plurality of pieces of data (sometimes referred to as records), which may be sent by and received from a host 30, to a tape recording medium (not shown) in units of fixed-length data sets (DSs), or overwrites a plurality of pieces of data (records). A DS is a set of pieces of data, and is the unit of writing to a tape having a fixed-length format structure, in one approach. Although this embodiment does not exclude the case where a DS has a variable length, the description of this embodiment is provided for the case where the DS has a fixed length.

The tape drive 10 includes an interface 11, a buffer 12, a read/write channel 13, a head 14, a motor 15, and reels 21 and 22 around which a tape 23 is wound, in one approach. The tape drive 10 includes a write-read controller 16, a head position control system 17, and a motor driver 18. The motor 15 may have two or more motors. The tape drive 10 has a tape cartridge 20 detachably mounted thereon.

The tape cartridge 20 includes the tape 23 wound around the reel 21. The tape 23 moves in a longitudinal direction from the reel 21 to the reel 22 or from the reel 22 to the reel 21 in accordance with the rotation of the reels 21 and 22. The tape 23 may be a tape medium other than a magnetic tape. In the tape drive 10, information of the attributes (called a tape directory) of the tape cartridge 20 is recorded on a contactless non-volatile memory called a CM 25 mounted in the tape cartridge 20 so that the tape 23 is capable of quickly being moved to a target position at the time of reading. The information recorded on the mounted CM 25 for the tape 20 is read by the tape drive 10 in a contactless manner, in one approach.

The head 14 writes information to the tape 23 or reads information from the tape 23 when the tape 23 moves in the longitudinal direction. The motor 15 causes the reels 21 and 22 to rotate. While the single motor 15 is illustrated, preferably, one motor is provided for each of the reels 21 and 22.

The write-read controller 16 controls overall operation of the tape drive 10, in one approach. For example, the controller 16 controls the writing of data to the tape 23 or reading of data from the tape 23 in accordance with a command received at the interface 11. The controller 16 further controls the head position control system 17 and the motor driver 18, and adds a correction code to data to be written or corrects read data for an error. The motor driver 18 drives the motor 15. The controller 16 also includes functions of the migration controller according to this embodiment.

The interface 11 communicates with the host 30, which is an example of a higher level device. The interface 11 receives from the host 30 a command for moving the tape 23 to a target position, a command for instructing the writing of data to the tape 23, and a command for instructing the reading of data from the tape 23. The above respective commands correspond to a positioning command, a Write command, and a Read command. Further, the interface 11 returns a reply to the host 30, indicating whether the process corresponding to each of the commands has succeeded or failed, in one approach. The host 30 specifies the position and number of pieces of variable-length data for the commands, and issues the specified results to the tape drive 10.

The buffer 12 is a memory that accumulates data to be written to the tape 23 or data read from the tape 23, in one approach. The buffer 12 comprises, for example, a dynamic random-access memory (DRAM) or any other suitable memory known in the art. The buffer 12 comprises a plurality of fixed-length buffer segments, and each buffer segment stores a DS that is the unit of reading from and writing to the tape 23. Each DS includes a single portion of data sent from the host 30 or a plurality of pieces of data. The data passed via the read/write channel 13 is written to the tape 23 using the head 14 in units of DSs (for example, 400 KB, 1.6 MB, etc.). A sync command is a command for writing data stored in the buffer 12 to the tape 23.

Figure 2:
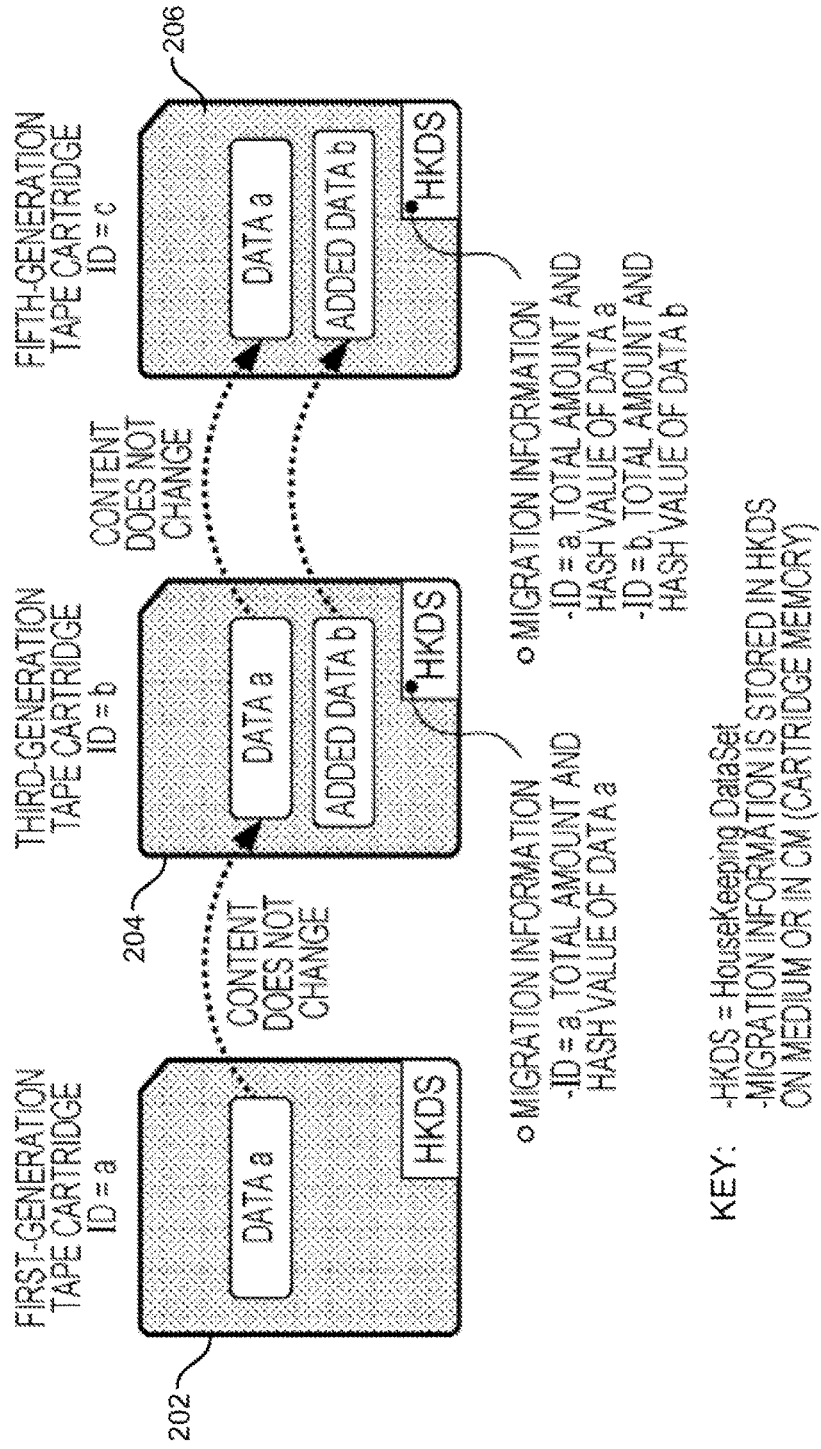
FIG. 2 illustrates a relationship between recording media migration of data over a plurality of generations and migration information, according to one embodiment.

FIG. 2 illustrates a relationship between recording media migration of data over a plurality of generations and migration information. DATA a is copied from a first-generation tape cartridge with an ID=a 202 to next-generation tape cartridges with ID=b 204 and ID=c 206 to ensure long-term storage of the data. The migration of the DATA a in the original medium (i.e., the first-generation tape cartridge a) to the fifth-generation tape cartridge c through the third-generation tape cartridge b is illustrated. It is useful to guarantee the reading and writing of archived data so that the original DATA a may be reliably read even if recording media change over generations. For this reason, the tape cartridge b holds, in addition to the DATA a in the original tape cartridge a, feature information including the ID of the original tape cartridge a and the total amount and/or hash value of the DATA a.

Because of the increasing recording capacities of first-generation, third-generation, and fifth-generation recording media (tape cartridges) as the generation number increases, it has become possible to write additional data to the migration destination medium. The cartridge c holds the feature information on the DATA a (ID=a, and the total amount or hash of the data a). The cartridge c also holds data b additionally recorded on the cartridge b and its feature information (ID=b, and the total amount and/or hash of the DATA b). The above pieces of feature information are held as migration information in either or both of a House Keeping Data Set (HKDS) and/or CM of the cartridge, in one approach.

The first-generation tape cartridge a (i.e., the original medium) does not have IDs or feature information in the HKDS or the like. When the DATA a in the tape cartridge a is migrated to the tape cartridge b, the total, amount and/or hash value of the DATA a are generated and are used as migration information concerning the tape cartridge b. During the migration, the migration controller reads the DATA a copied to the tape cartridge b, generates the total amount and/or hash of the data, and compares the generated total amount and/or hash with the above-described migration information, in one approach.

FIG. 3 illustrates a table 300 having migration information held in cartridges. The tape cartridge c holds the DATA a in the first-generation cartridge a and the added DATA b in the second-generation cartridge b. The migration information held in the cartridge c includes the feature information of cartridge ID=a and ID=b, which are held in a separate manner. For cartridge ID=a, the total amount of the DATA a and/or its hash value is associated. For cartridge ID=b, the total amount of the new added DATA b and/or its hash value is associated.

In this way, due to the increasing recording capacities of recording media as the generation number increases, it is conceivable that a plurality of pieces of migration data are included. In one embodiment, tampering of data at the time of a plurality of migrations from the respective generation recording media may be detected by checking the media IDs and feature information on the data. Furthermore, in a single latest generation medium, the management of new added data in each generation recording medium is facilitated using the ID of the original medium on which data that the added data is based on is recorded, and using the feature information on the added data, in one approach.

Figure 4:
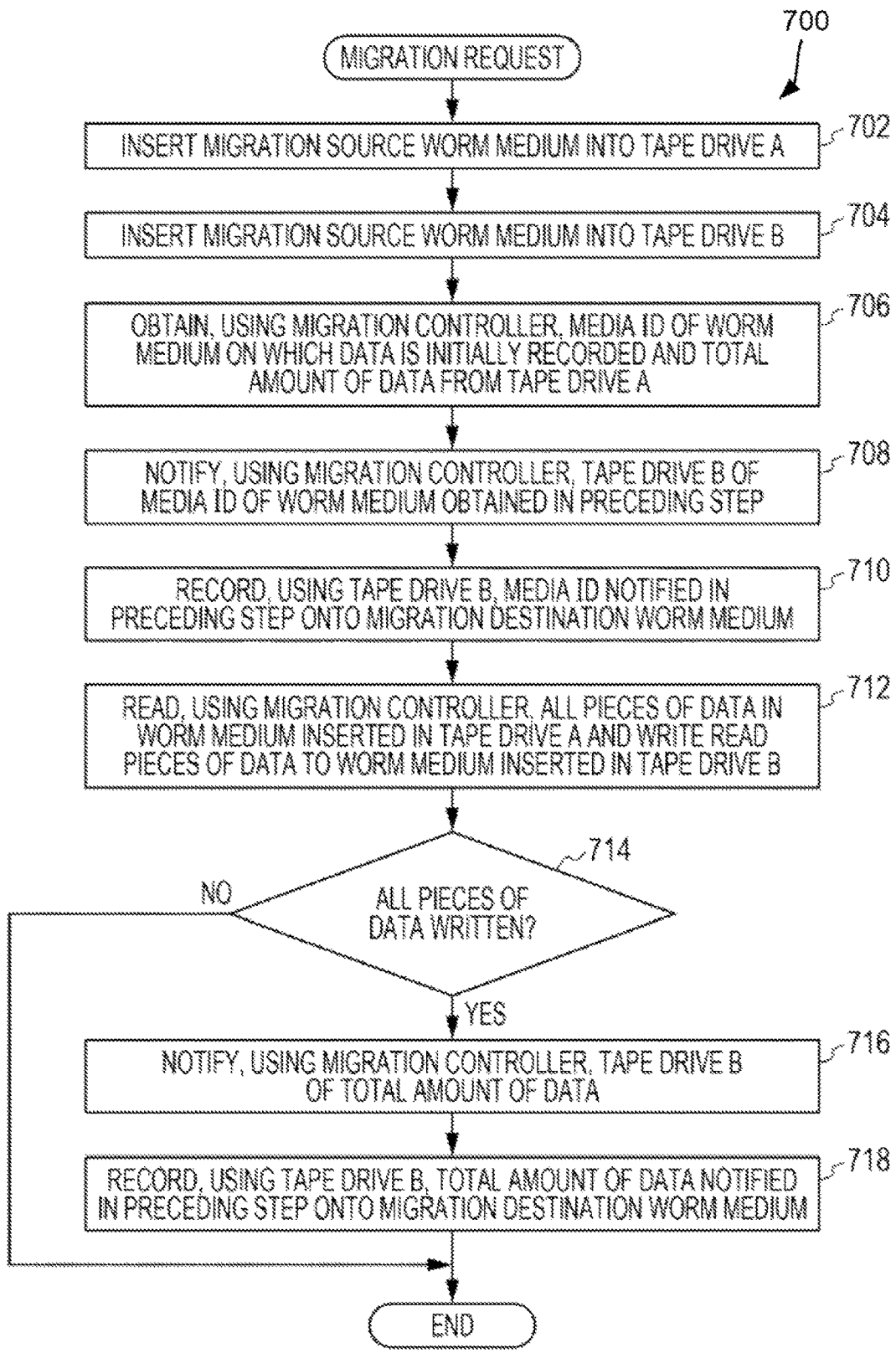
FIG. 4 illustrates a flowchart of a method for migrating data stored in a Write Once Read Many (WORM) medium sing two tape drives, according to one embodiment.

FIG. 4 illustrates a flowchart eta method 700 for migrating data stored in a WORM medium using two tape drives.

In operation 702, migration source WORM medium is inserted into tape drive A, as an example.

In operation 704, migration source WORM medium is inserted into tape drive B, as an example.

In operation 706, using a migration controller, media ID of a WORM medium on which data is initially recorded is obtained, along with a total amount of data from tape drive A.

In operation 708, using the migration controller, tape drive B is notified of media ID of the WORM medium obtained in operation 706.

In operation 710, the media ID is recorded using tape drive B onto migration destination WORM medium inserted in tape drive B.

In operation 712, using the migration controller, all pieces of data are read in the WORM medium inserted in tape drive A and the read pieces of data are written to the WORM medium inserted in tape drive B.

In operation 714, it is determined if all pieces of data have been written. If so, the method 700 continues to operation 716, otherwise the method 700 is ended.

In operation 716, using the migration controller, tape drive B is notified of the total amount of data migrated and/or a hash of the data.

In operation 718, the total amount data migrated and/or a hash of this data is recorded, using tape drive B, onto the migration destination WORM medium.

A check is made to determine whether data recorded on the migration destination WORM medium has not been tampered with from data recorded on the initial WORM medium. This check may be made by checking that the initial media ID and the total amount of the associated data are recorded on an HKDS, or the like, of the migration destination WORM medium. The risk of tampering due to the migration destination WORM medium being extracted during migration is detectable because the total amount of the data is not recorded in the HKDS.

The check of whether all the pieces of data have been successfully written may be made by reading all the pieces of data from both the migration source and destination WORM media after the data has been written and by comparing the read pieces of data from the migration source and destination WORM media, in one approach. In addition, when data is migrated, the data may be encrypted using any generated key, such as an arbitrary key, before the data is extracted to the outside from the original drive, and the drive at the receiver side may decrypt the data and may write the decrypted data to a tape, in one approach. In this approach, the key to be used for encryption is generated by the drive at the receiver side, and is wrapped with a public key of the migration source drive before the key is sent to the migration source drive.

An exemplary embodiment in which a migration source WORM medium and a migration destination WORM medium have one-to-one correspondences has been described above. Migration from a plurality of WORM media to a single WORM medium may also be performed and is supported by the embodiments described herein. Distributed migration from a single WORM medium to a plurality of WORM media may also be performed. In this case, it is also beneficial to record media IDs and the total amounts of the data onto each migration destination WORM medium through the above-described procedure, in one approach. Preferably, a correspondence table between record numbers in the original and record numbers in the migration destination may be used as additional information, in one approach.

Figure 5:
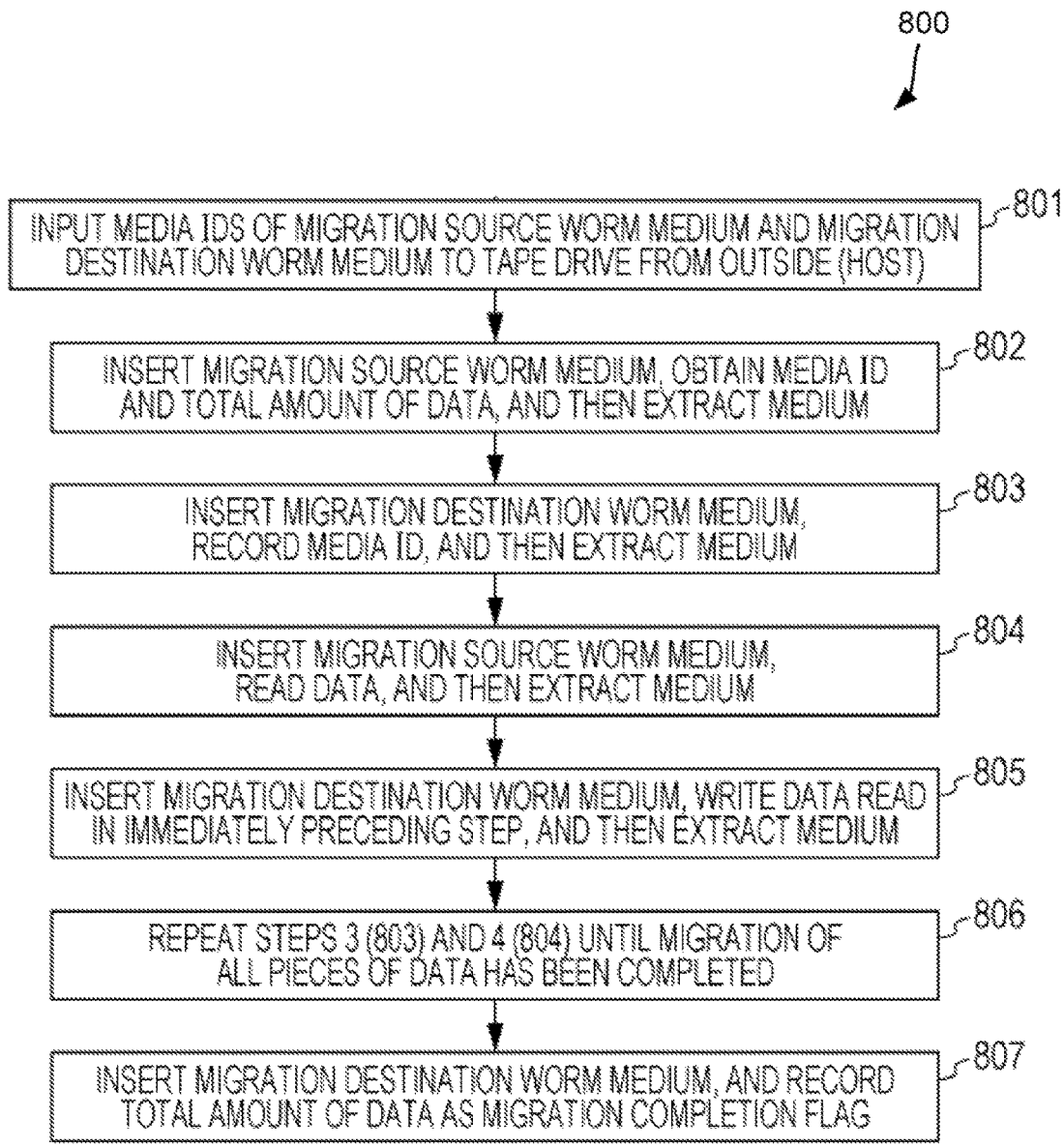
FIG. 5 illustrates processing steps of a controller of a tape drive, according to one embodiment.

FIG. 5 illustrates processing steps of a method 800 that may be executed by a controller of a tape drive, in one embodiment. A controller of a tape drive is configured to be able to perform migration according to this embodiment in the following operations.

The controller (or firmware thereof) of the tape drive may incorporate a migration controller, in one embodiment. The migration controller may be incorporated in firmware of a tape drive, in a further embodiment.

In operation 801, the media IDs of the migration source WORM medium and the migration destination WORM medium are input to the tape drive from an external source, such as a host.

In operation 802, the migration source WORM medium is inserted into a tape drive, and the media ID and the total amount of the data is obtained therefrom. After that, the medium is extracted from the tape drive.

In operation 803, the migration destination WORM medium is inserted into the tape drive, and the media ID is recorded thereto. After this recordation, the medium is extracted from the tape drive.

In operation 804, the migration source WORM medium is inserted into the tape drive, and data is read therefrom. After this read, the medium is extracted from the tape drive.

In operation 805, the migration destination WORM medium is inserted into the tape drive, and the read data is written thereto. After that, the medium is extracted from the tape drive.

In operation 806, operations 803 and 804 are repeated until migration of all pieces of data has been completed.

In operation 807, the migration destination WORM medium is inserted into the tape drive, and the total amount of the data (and/or a hash thereof) is recorded as a migration completion flag.

The tape drive may request that a tape library insert and extract the various tape media, in one approach. A plurality of tape drives may be designed to perform migration while communicating with one another. In this case, for example, one of the tape drives reads all the pieces of data written in the media before and after migration and compares the read pieces of data. After it is checked that both pieces of data before and after migration match, a migration completion flag may be written to the migration destination medium after migration, in one approach.

The existence of feature information when recorded on the migration destination WORM medium means that the data written in the WORM medium has been migrated. The existence of information indicating features (the total amount of the data, its hash value, etc.) means that no tampering has occurred during migration. If tampering has occurred during migration, the migration controller does not record information indicating features onto the migration destination medium. A match between the total amount of the data written in the migration destination WORM medium and the total amount of the data included in the feature information means that no data has been added after migration.

According to embodiments described herein, therefore, it is guaranteed that data, once recorded on a medium, is not updated/erased even though it has been migrated. While the present invention has been described using an exemplary embodiment, the scope of the present invention is not limited to the foregoing exemplary embodiment. It is apparent to those skilled in the art that various variations and alternative embodiments can be used without departing from the spirit and scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above. It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A storage device for generating and recording metadata in a migration destination medium, the metadata being for enabling detection of a change in data during media migration between write once read many (WORM) media, the storage device comprising:
    a controller comprising:
        logic configured to receive an identifier (ID) of a migration source medium, at least one ID of a previous source medium, and feature information indicative of a total amount of data to be migrated from the source medium, the data including data from the previous source medium stored on the source medium;
        logic configured to hold the ID of the source medium and the at least one ID of the previous source medium in a non-user storage area in the destination medium, the ID of the previous source medium differentiating the previous source medium from other media including the source medium;
        logic configured to hold first feature information of the data as stored on the source medium in the non-user storage area of the destination medium, wherein the first feature information represents one or more features of the data as stored on the source medium, wherein the feature information is added to the non-user storage area using a writing technique which only the controller is allowed to use; and
        logic configured to hold migrated data feature information of any previous data as stored on the previous source medium in the non-user storage area.

2. The storage device as recited in claim 1, wherein in order to detect a change in data during media migration, the controller further comprises:

logic configured to check, after the writing, whether the ID of the source medium and the ID of the previous source medium have been held in the non-user storage area in the destination medium;

logic configured to check, after the writing, whether the first feature information of the data as stored on the source medium has been held in the non-user storage area;

logic configured to check, after the writing, whether second feature information of the data as stored on the destination medium, the ID of the source medium, and the ID of the previous source medium match the first feature information, the ID of the source medium, and the ID of the previous source medium held in the non-user storage area; and logic configured to determine that tampering has occurred during migration in response to a negative determination being obtained from any of the logic configured to check.

3. The storage device as recited in claim 2, wherein the first feature information of the data comprises a hash value of the data stored on the source medium.

4. The storage device as recited in claim 2, wherein the logic configured to check whether the second feature information of the data as stored on the destination medium, the ID of the source medium, and the ID of the previous source medium matches the first feature information, the ID of the source medium, and the ID of the previous source medium held in the non-user storage area comprises:

logic configured to generate the second feature information from the data stored on the destination medium;

logic configured to compare the ID of the source medium with the ID of the source medium held in the non-user storage area;

logic configured to compare the IDs of previous source media with the IDs of previous source media held in the non-user storage area; and logic configured to compare the first feature information held in the non-user storage area with the second feature information generated from the data written to the destination medium.

5. The storage device as recited in claim 4, wherein the first feature information held in the non-user storage area is stored in a housekeeping data set (HKDS) and/or a cartridge memory (CM) of a tape cartridge, the tape cartridge housing the destination medium.

6. The storage device as recited in claim 4, wherein the source medium serves as a migration destination medium of a previous-generation medium having one of the IDs of previous source media, and wherein the source medium holds the ID of the previous-generation medium and feature information of data from the previous-generation medium in a non-user storage area of the source medium.

7. The storage device as recited in claim 6, wherein the source medium holds, in addition to the data of the previous-generation medium, data additionally recorded when the source medium is used, wherein the ID of the source medium is assigned to the additionally recorded data, and wherein the first feature information of the data on the source medium includes feature information of the additionally recorded data.

8. The storage device as recited in claim 4, wherein the source medium does not hold a media ID and feature information of data from previous source media when the source medium is an original medium, and wherein feature information is assigned to the ID of the source medium and data therein during migration of the data to the destination medium.

9. A method for detecting a change in data during media migration between write once read many (WORM) media, the method comprising:

receiving an identifier (ID) of a migration source medium and feature information indicative of a total amount of data to be migrated from the source medium;

holding the ID of the source medium in a non-user storage area in a destination medium, wherein the ID of the source medium is configured to identify the source medium during data migration from other possible source media;

holding the feature information in the non-user storage area;

after holding the ID and feature information in the non-user storage area of the destination medium, receiving data for WORM from the source medium;

writing the received data to the destination medium;

after the writing, comparing the feature information held in the non-user storage area with a value corresponding to the amount of the data written to the destination medium; and determining that tampering has occurred during migration in response to determining that the value is different than the feature information held in the non-user storage area.

10. The method as recited in claim 9, further comprising:

after the writing, checking whether a recorded and managed ID of the source medium has been held in the non-user storage area in the destination medium;

after the writing, checking whether the feature information of the data has been held in the non-user storage area;

after the writing, receiving the ID of the source medium again, and checking whether the ID matches the ID held in the non-user storage area; and determining that tampering has occurred during migration when a negative determination is obtained in at least one of the checking steps.

11. The method as recited in claim 10, wherein the feature information of the data comprises a total amount of the data and/or a hash value of the data wherein the feature information is added to the non-user storage area using a writing technique which only a controller of a device writing the received data to the destination medium is allowed to use.

12. The method as recited in claim 10, wherein the checking whether the feature information of the data and the ID match the information and ID held in the non-user storage area comprises comparing the feature information of the data held in the non-user storage area with feature information generated from data written to the destination medium.

13. The method as recited in claim 12, wherein the feature information is held in a location selected from the group consisting of: a housekeeping data set (HKDS) and a cartridge memory (CM) of a tape cartridge.

14. The method as recited in claim 12, wherein the source medium serves as a migration destination medium of a previous-generation medium, wherein the source medium holds an ID of the previous-generation medium and feature information of data, wherein the source medium holds, in addition to the data of the previous-generation, data additionally recorded when the source medium is used, wherein an ID of the source medium is assigned to the additionally recorded data, and wherein the feature information includes feature information of the additionally recorded data.

15. The method as recited in claim 12, comprising sending an encryption key from a device writing the data to the destination medium to a device sending the data from the source medium, wherein the data received from the source medium is encrypted using the encryption key, and comprising decrypting the received data and writing the decrypted data to the destination medium.

16. A computer program product for detecting at a migration destination medium a change in data during media migration between write once read many (WORM) media, the computer program product comprising a non-transitory computer readable storage medium having program code embodied therewith, the program code readable/executable by a device to:
  write, by the device, data for WORM from a migration source medium to the migration destination medium;
  hold, by the device, an identifier (ID) of the source medium in a non-user storage area in the destination medium, wherein the ID of the source medium is configured to identify the source medium during data migration from other possible source media; and
  hold, by the device, feature information in the non-user storage area, wherein the feature information indicates one or more features of the data selected from a group consisting of: a total amount of the data stored on the source medium or a hash value of the data stored on the source medium,
  wherein the feature information is added to the non-user storage area using a writing technique which only the device is allowed to use.

17. The computer program product as recited in claim 16, wherein the program code is further readable/executable by the device to:
  check, by the device, whether a recorded and managed ID of the source medium has been held in the non-user storage area in the destination medium;
  check, by the device, whether the feature information of the data has been held in the non-user storage area;
  check, by the device, whether the feature information of the data and the ID match the information and ID held in the non-user storage area; and
  determine, by the device, that tampering has occurred during migration when a negative determination is obtained in any of the computer readable program code configured for checking.

18. The computer program product as recited in claim 17, wherein the program code is further readable/executable by the device to write a migration completion flag to the destination medium in response to positive determinations being obtained in all of the computer readable program code configured for checking.

19. The computer program product as recited in claim 17, comprising program code executable by the device to receive at least one ID of a previous source medium, and feature information indicative of a total amount of data to be migrated from the source medium, the data including data from the previous source medium stored on the migration source medium.

20. The computer program product as recited in claim 17, wherein the source medium serves as a migration destination medium of a previous-generation medium, wherein the source medium holds an ID of the previous-generation medium and feature information of data,
  wherein the source medium holds, in addition to the data of the previous-generation, data additionally recorded when the source medium is used, wherein an ID of the source medium is assigned to the additionally recorded data, wherein the feature information includes feature information of the additionally recorded data,
  wherein the source medium does not hold a media ID or feature information when the source medium is an original medium, and wherein the destination medium assigns feature information to the ID of the source medium and data therein.

* * * * *